United States Patent [19]

Zacharias

[11] Patent Number: 5,120,275
[45] Date of Patent: Jun. 9, 1992

[54] CHAFF SPREADING ATTACHMENT FOR COMBINES

[75] Inventor: Clarence M. Zacharias, Swift Current, Canada

[73] Assignee: REM Manufacturing Limited, Saskatchewan, Canada

[21] Appl. No.: 565,356

[22] Filed: Aug. 9, 1990

[51] Int. Cl.⁵ .................. A01F 12/48; A01F 29/12
[52] U.S. Cl. .......................... 460/111; 56/13.3
[58] Field of Search .............. 460/111, 112; 56/13.3, 56/13.4

[56] References Cited

U.S. PATENT DOCUMENTS

| | | | |
|---|---|---|---|
| 2,626,159 | 1/1953 | Thompson | 460/111 X |
| 4,137,923 | 2/1979 | Druffel et al. | 460/112 |
| 4,617,942 | 10/1986 | Garner | 460/112 |
| 4,637,406 | 1/1987 | Guinn et al. | 460/112 |
| 4,711,253 | 12/1987 | Anderson | 56/13.3 X |
| 4,923,431 | 5/1990 | Miller et al. | 460/111 |

FOREIGN PATENT DOCUMENTS

| | | | |
|---|---|---|---|
| 212337 | 3/1987 | European Pat. Off. | 460/111 |
| 331784 | 9/1989 | European Pat. Off. | 460/112 |
| 3615151 | 11/1987 | Fed. Rep. of Germany | 460/112 |

Primary Examiner—Hoang C. Dang
Attorney, Agent, or Firm—Hovey, Williams, Timmons & Collins

[57] ABSTRACT

The attachment is mounted on the combine near the chaff discharge outlet and includes a transverse trough positioned to receive chaff particles issuing from the outlet. A powerful, fast-moving stream of air introduced into the trough near its center is split into two oppositely moving streams directed toward opposite ends of the trough so that the chaff particles become entrained in the streams and propelled to outboard locations before dropping to the ground in a dispersed and scattered condition.

10 Claims, 2 Drawing Sheets

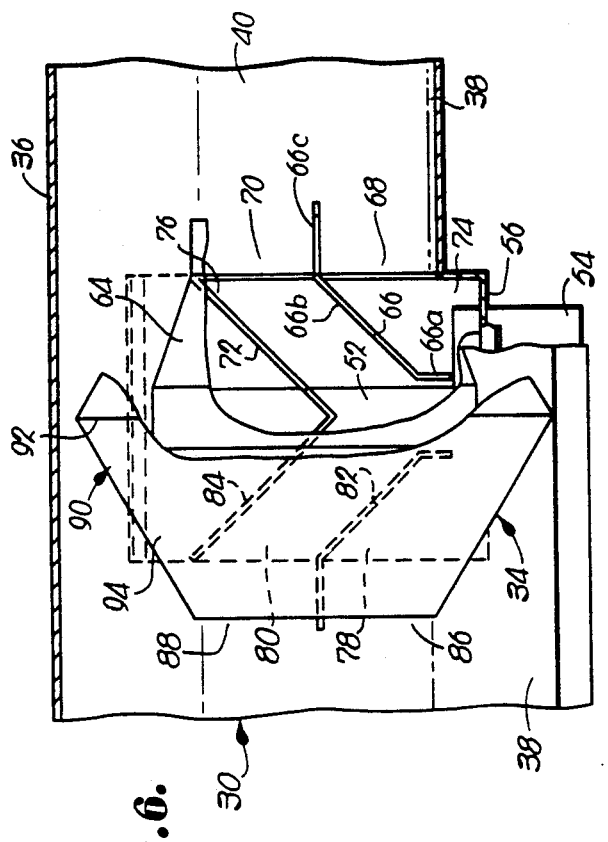
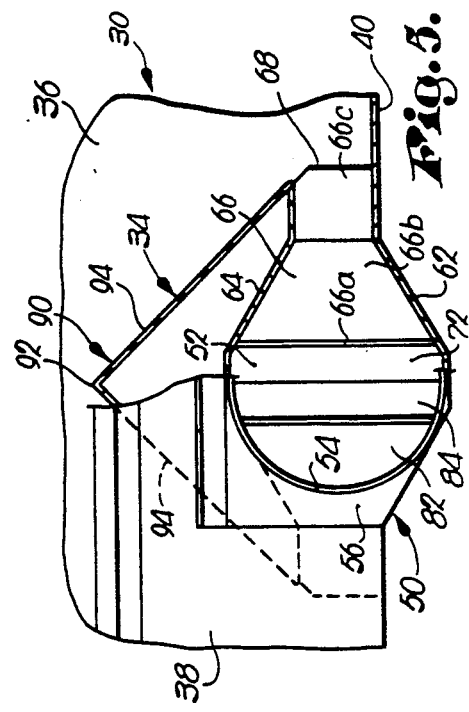
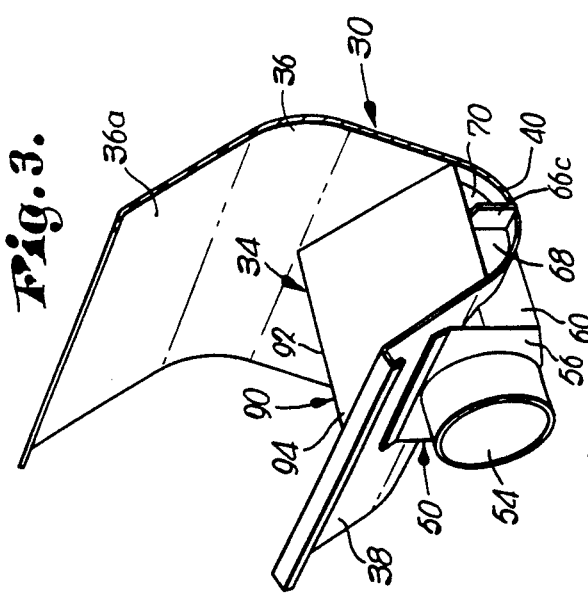
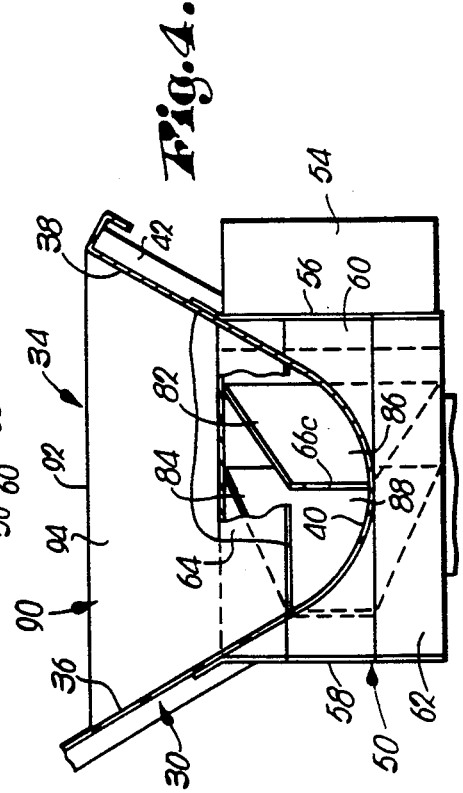

CHAFF SPREADING ATTACHMENT FOR COMBINES

TECHNICAL FIELD

The present invention relates to a combine attachment used to spread hulls, husks, and other chaff residue from the threshing mechanism of the combine evenly over the field from the rear of the combine as the machine carries out its harvesting operations.

BACKGROUND

Although it has been a common practice for many years to provide straw chopper attachments at the rear of combines for disintegrating and spreading larger crop residue, such as leaves, stems and stalk portions separated from the grain during threshing operations within the combine, little attention has been paid to the fine, very lightweight chaff particles such as hulls and husks that surround the seed and are also separated by the combine during its threshing process. Because of the very light nature of such chaff particles, they are inherently difficult to handle, and yet they need to be spread evenly on the field as they are discharged from the combine rather than be dumped in irregular, concentrated clumps.

Accordingly, one important object of the present invention is to provide a spreading attachment for the chaff discharge outlet of a combine which is capable of receiving chaff as it issues from the conventional discharge outlet of a combine and propelling it away from the immediate vicinity of the harvester to scatter and diffuse the chaff relatively evenly on the field as the harvester continues to advance.

In carrying out this object, the present invention contemplates the attachment of an auxiliary air source to the combine which produces a rapidly, yet smoothly, flowing carpet of air in a transversely disposed discharge trough so the chaff particles are directed onto the air stream as they exit the combine and are quickly projected laterally outwardly of the harvester where they fall to the ground in a diffused and scattered condition. In preferred form, the invention contemplates a trough that extends across the rear of the combine and which receives an airflow near the center of the trough which is split into two oppositely moving, left and right air streams that are effective in carrying the chaff to outboard locations. Chaff emanating from the discharge outlet of the combine falls down into the trough near the central point and is immediately entrained by the oppositely moving air streams for delivery to the outboard locations. An upright baffle at the aft end of the trough helps deflect errant chaff particles down into the oppositely moving streams.

BRIEF DESCRIPTION OF THE DRAWINGS

FIG. 3 is a right front perspective view of the central portion of the trough and air diffuser associated with the spreader attachment of the present invention;

FIG. 4 is a left side elevational view of the trough and diffuser with portions of the trough and diffuser broken away and shown in cross section to reveal details of construction;

FIG. 5 is a fragmentary, front elevational view of the trough and air diffuser with portions broken away and shown in cross section to reveal details of construction; and FIG. 6 is a fragmentary, top plan view of the trough and diffuser with portions broken away and shown in cross section to reveal details of construction.

DETAILED DESCRIPTION

Figure 1:
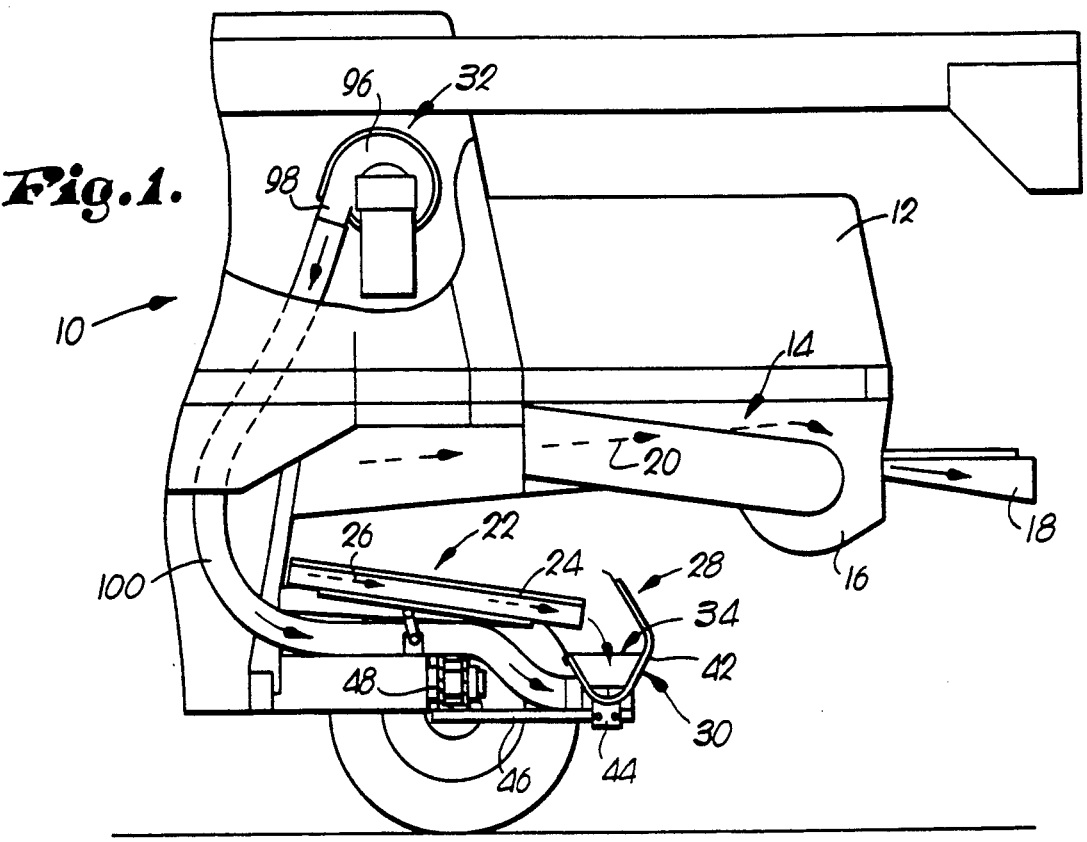
FIG. 1 is a fragmentary side elevational view of the rear of a typical combine employing a chaff spreading attachment which embodies the principles of the present invention.

As illustrated in FIG. 1, the combine 10 has a rearwardly disposed hood 12 that houses structure which may broadly be described as a straw outlet 14. Typically, a chopper 16 may be attached to the hood 12 generally below the latter for receiving the straw from the outlet 14, further disintegrating such materials, and propelling the same rearwardly for interaction with rearwardly and outwardly diverging fins 18 which help direct and spread the airborne straw materials outwardly and rearwardly. The straw residue moving rearwardly through the machine and into the chopper 16 is illustrated by the arrows 20.

The combine 10 is also provided with a chaff discharge outlet broadly denoted by the numeral 22. In the illustrated embodiment, the chaff outlet 22 comprises a rearwardly converging chute 24 that is angled slightly downwardly and rearwardly and is operably coupled with agitating mechanism within the combine to reciprocate the chute 24 in a fore-and-aft direction for encouraging the rearward movement of the chaff particles. In FIG. 1, and also as shown in FIG. 2, the chaff particles moving through the discharge outlet 22 are denoted generally by the arrows 26.

In accordance with the present invention, the combine 10 is provided with a chaff spreading attachment broadly denoted by the numeral 28 which receives the chaff particles from the chaff discharge chute 24 and propels them laterally outwardly from the harvester in two opposite directions for scattering and spreading onto the ground. Broadly speaking, the attachment 28 includes three major components, i.e., a transversely disposed, open top trough 30, a source of high velocity air, such as the blower 32, and a diffuser 34 located within the trough 30 for receiving a stream of air from the blower 32 and splitting it into two separate air streams moving from the center of the trough 30 laterally outwardly in opposite directions along the floor of the latter.

The trough 30 is generally transversely U-shaped with a high back wall 36, a relatively low front wall 38, and a curved floor 40 interconnecting the walls 36,38. The walls 36,38 converge downwardly toward the floor 40, except for an upper portion 36a of back wall 36 which projects generally upwardly and forwardly beyond the level of the discharge chute 24 to serve as a deflector for errant chaff particles emanating from the trough 30. In the preferred embodiment the walls 36,38 and the floor 40 of the trough 30 are integrally joined together as interconnected portions of a formed metal sheet, although laterally outer extensions may be added to the trough 30 from separate and discrete sections of material, if desired.

Figure 2:
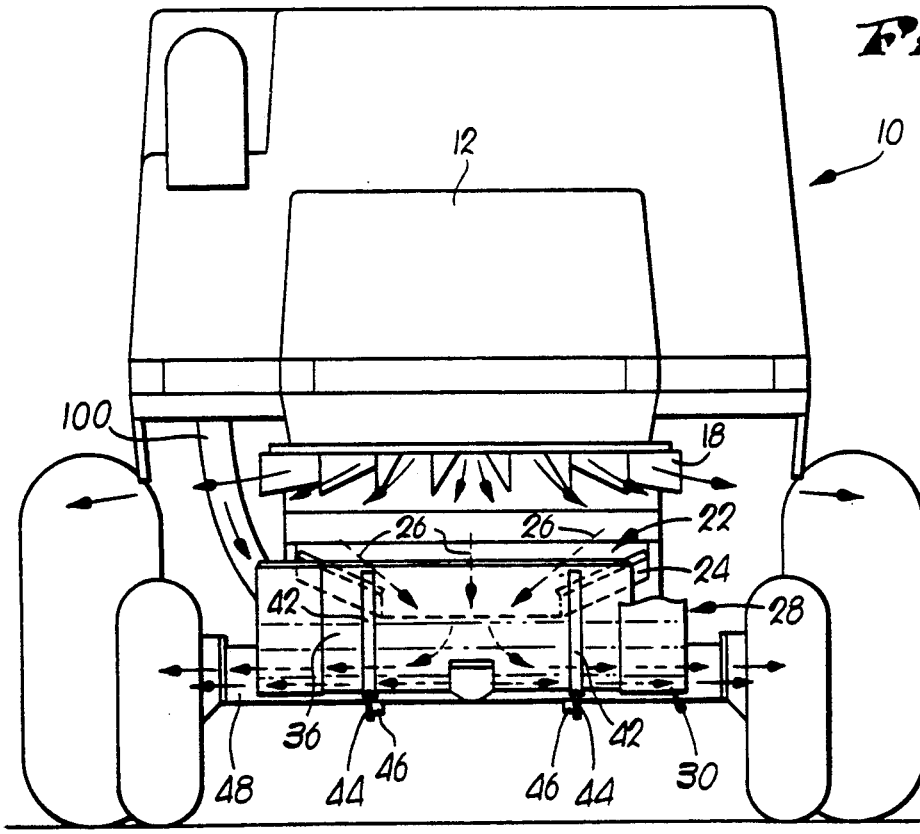
FIG. 2 is a rear elevational view thereof.

As perhaps illustrated best in FIGS. 1, 2, and 4, the trough 30 is provided with a pair of generally U-shaped ribs 42 that are spaced longitudinally of the trough 30 and are wrapped about the exterior of the latter to provide structural integrity. Each of the ribs 42 is provided at its lowermost extremity with a depending bracket 44 which is bolted to a fore-and-aft extending support member 46 attached to the transversely extending rear axle 48 of the combine. Thus, the support members 46 provide a means of mounting the trough 30 on the combine 10 and are of such length as to position the trough 30 immediately behind and below the rearmost discharge end of the chaff discharge chute 24.

The diffuser 34 located within the trough 30 comprises an enclosed housing 50 having an internal air chamber 52 which receives air from the blower 32 via a circular inlet 54 located exteriorly of the front wall 38. As illustrated in FIGS. 3-6, the housing 50 intersects the trough 30 transversely and projects in opposite fore-and-aft directions beyond the trough 30 as well as in opposite vertical directions beyond the floor 40 of the latter. A front wall 56 of housing 50 attaches to the front wall 38 of trough 30 exteriorly of the latter and depends therefrom to a position somewhat below the floor 40. The inlet 54 is secured to and projects forwardly from the front wall 56. At the other extreme, a rear wall 58 is secured to and depends from the rear wall 36 of the trough 30. Front and rear walls 36,58 are interconnected by fore-and-aft extending side walls 60 of the housing 50, which are generally rectangular with the exception of a generally crescent shaped central cutout, as illustrated in FIG. 4, that permits appropriate intersection of the side walls 60 with the arcuate floor 40 of the trough 30. Thus, the side walls 60 of the housing 50 do not enter the interior of the trough 30.

The housing 50 further includes a formed bottom wall 62 that extends between the front and rear walls 56,58 and transversely spans the two opposite side walls 60. The bottom wall 62 is located completely outside of the trough 30. The bottom wall 62 commences at its laterally opposite extremes at the same level as the lowermost extent of the floor 40, converging downwardly and inwardly therefrom to a lowermost point which is spaced a distance below the floor 40. At its upper extreme, the housing 50 includes a formed top wall 64 which is the mirror image of the bottom wall 62, interconnecting the front and rear walls 56,58 and the two side walls 60. The top wall 64 is disposed almost entirely within the interior of the trough 30, except for opposite endmost portions intersecting with the front and rear walls 56,58. As illustrated in FIGS. 4 and 5, the bottom wall 62 and the top wall 64 are spaced apart at their central locations a distance corresponding generally to the diameter of the inlet 54.

The chamber 52 within the housing 50 is provided with a number of baffles which function to split the incoming single stream of air through inlet 54 into a pair of air streams that move laterally in opposite directions at 90° to the path of travel of the incoming air. The baffles are arranged symmetrically so that the incoming air flow is split equally into the two right and left moving streams.

As noted particularly in FIGS. 4, 5, and 6, the internal baffles include an upright baffle 66 having an entry portion 66a set radially inwardly from the lateral extremity of the inlet 54 and extending parallel to the central axis thereof. A diagonal portion 66b extends rightwardly at approximately 45° from the entry portion 66a to the side wall 60 where a terminal portion 66c projects laterally therefrom at right angles to the axis of the inlet 54 and parallel to the longitudinal axis of the trough 30. The terminal portion 66c is located equidistantly between the rear wall 36 and the front wall 38 of the trough 30 and serves to define a pair of outlet ports 68 and 70 on opposite sides of terminal portion 66c in cooperation with the trough walls 36, 38 and the floor 40. As illustrated in FIGS. 4 and 5, the baffle 66 has its central diagonal portion 66b tapering toward a reduced dimension as the terminal portion 66c is approached, such tapering being carried out symmetrical with respect to a horizontal plane which bisects the air chamber 52 and the outlet ports 68,70 and the inlet 54. A second baffle 72 on the right side of the chamber 52 viewing FIG. 6 is also provided internally of the housing 50 in parallel relationship to the diagonal midportion 66b of baffle 66 and spaced rearwardly from the latter. The baffle 72 has the same tapering configuration as the baffle 66, although the baffle 72 extends for a slight distance further inwardly toward the fore-and-aft central axis of the housing 50.

As a result of the presence of the two baffles 66 and 72, a pair of right flow passages 74 and 76 are defined within the air chamber 52 communicating the inlet 54 with the two outlet ports 68,70. Corresponding left flow passages 78 and 80 are defined on the left side of the chamber 52 by baffles 82 and 84 which are mirror images of the corresponding right baffles 66 and 72, respectively. Likewise, corresponding left outlet ports 86 and 88 are provided on the left side of the housing 50 corresponding to the right outlet ports 68,70, respectively. Generally speaking, and in preferred form, the total cross sectional area of the ports 68,70 and 86,88 is approximately the same as the total transverse cross sectional area of the inlet 54 such that, although the air entering the diffuser 34 is split and redirected, it is not constricted in the nature of a nozzle. Thus, laminar flow is encouraged in spite of the abrupt change in direction experienced by the air entering the single inlet 54.

The diffuser 34 is also provided with a roof 90 having an apex 92 located in the same vertical plane as the centerline of the air inlet 54 and the air chamber 54. The roof 90 has a pair of opposite slope sheets 94 which diverge symmetrical from the apex 92 down to the respective outlet ports 66,70, and 86,88. The slope sheets 94 extend the full fore-and-aft width of the trough 30 and intersect diagonally with the front wall 38 and the back wall 36 of the trough 30.

The third major part of the spreader attachment 28, i.e., the blower 32, preferably includes a centrifugal fan 96 having an outlet 98 that is coupled in communication with the inlet 54 of the diffuser 34 via a flexible conduit 100. Other types of blowers may be utilized and placed in different locations than that illustrated in FIG. 1; however, it is preferred that a relatively high velocity fan be utilized, capable of producing air flow in the range of 1,500 to 2,500 cubic feet per minute. A fan suitable for use in connection with the present invention may be obtained from REM Manufacturing Ltd. of Swift Current, Saskatchewan, Canada, identified as the REM Model HE33 fan.

Operation

As the combine 10 moves through the field carrying out its harvesting operations, it simultaneously threshes the harvested grain and discharges straw, stems and larger residue through the straw discharge outlet 15. Simultaneously, hulls, husks, and other light chaff which have been separated from the grain are discharged through the chaff discharge outlet 22 and are directed by the chute 24 into the trough 30.

As a result of the continuous stream of air provided into the diffuser 34 by the blower 32, a pair of continuous, oppositely moving air streams are produced in the trough 30 issuing from the outlet ports 68,70 on the one hand and the outlet ports 86,88 on the other hand. These two streams maintain a relatively low profile within the trough 30 along the floor 40 and move at a relatively high velocity without turbulent flow.

The chaff materials leaving the chaff discharge chute 24 drop into the trough 30 and are immediately entrained by the left or right air stream depending upon which is closer to the chaff particles at the time of their discharge from the trough 30. Such airborne particles are then projected outwardly beyond the corresponding outermost end of the trough 30 until they lose their momentum and drop to the ground in a scattered and dispersed condition. Preferably, the total spread width of the chaff is on the order of 40 to 50 feet as measured from one lateral extremity of the chaff layer to the opposite extremity across the rear width of the combine. It will be appreciated that the chaff materials located in the center of the discharge chute 24 and dropping onto the diffuser 34 are prevented from remaining in that location by virtue of the oppositely inclined slope sheets 94 on the roof 90 that overlies the diffuser 34.

It is to be noted that although the air from the blower 32 enters the diffuser 34 in a rearward direction and is then redirected 90° into laterally outwardly extending flow paths, such change in direction is accomplished smoothly and without turbulent flow which would disrupt the orderly transfer of the light chaff materials to their outlying points of discharge. As illustrated in FIG. 4, for example, it will be seen that as the single stream of air enters the inlet 54 and passes into the diffuser 34, the stream is converged symmetrically in a vertical direction as it is directed toward the outlet ports 68,70 and 86,88. Thus, air moving through the diffuser 34 toward the outlets 68,70 and 86,88 is directed downwardly by the same distance it is directed upwardly, all of which results in a smooth discharge into the trough 30.

It will be appreciated that in some combines, particularly the so-called "rotary combines", a significant amount of straw is discharged from the chaff outlet along with the chaff itself. Thus, although the present invention is described primarily in connection with the spreading of chaff, it will be understood that the principles of the present invention are not limited exclusively to chaff handling, but also extend to mixtures of chaff and straw, as well as to straw alone. In this latter regard, it is contemplated that the present invention could be utilized in connection with the straw outlet of a combine for dispersing and spreading the straw residue instead of using a conventional rotary straw chopper or the like.

Accordingly, it should be apparent that the present invention as hereinabove set forth provides a significant improvement in the distribution of residue from a combine. While obvious modifications in the exemplary apparatus described above could be made by those skilled in the art, such changes are still within the scope of the present invention, which should be limited only by the literal language of the claims which follow and their mechanical equivalents.

I claim:

1. In a harvester having separate straw and chaff discharge outlets, a spreader for chaff issuing from the chaff discharge outlet comprising:

a transversely extending trough positioned below the chaff outlet for catching chaff as it issues therefrom, said trough having a pair of opposite outer ends disposed laterally outboard of the chaff outlet;

an air diffuser coupled with said trough between said outer ends and adapted to create two separate streams of air flowing in opposite directions along the floor of the trough from a central point in the trough to and beyond the outer ends of the trough; and means for supplying a continuing volume of air under pressure to said diffuser whereby to cause chaff particles discharged from the chaff outlet of the harvester to be entrained in the oppositely moving air streams of the trough and transported to outboard locations for spreading on the ground, said diffuser having a pair of oppositely directed outlet ports adjacent the floor of the trough, one of said ports being directed toward one end of the trough and the other of said ports being directed toward the other end of the trough, said diffuser further having a single air inlet coupled with said supplying means and structure for dividing the single flow of air from said air inlet into the two separate air streams leaving the diffuser through said outlet ports, said air inlet of the diffuser being disposed at substantially right angles to the outlet ports and in generally the same horizontal plane whereby to promote laminar flow along the floor of the trough, said outlet ports and said air inlet being symmetrical with respect to a common horizontal plane that contains the central axis of the air inlet, said outlet ports having reduced vertical dimensions relative to the air inlet, and the diffuser being provided with internal passages communicating the outlet ports with the air inlet and tapering toward the outlet ports whereby to progressively diminish the cross-sectional size of the air streams, said diffuser having a pair of side-by-side outlet ports directed toward each end of the trough.

2. A chaff spreader attachment for combines, including:

a trough having a pair of opposite discharge ends, a floor extending between said discharge ends, and a pair of spaced sidewalls projecting upwardly from said floor along the length of the latter;

means for mounting said trough on a combine with the trough extending transverse to the normal path of travel of the combine and with a central portion thereof in position to catch chaff particles issuing from a chaff outlet of the combine;

a diffuser coupled with the trough and adapted to create two separate streams of air flowing in opposite directions along said floor of the trough from the central portion thereof to and beyond said outer ends of the trough; and means for connecting the diffuser with a source of a continuing volume of air under pressure for causing chaff particles discharged from the chaff outlet of the combine to be entrained in the oppositely moving air streams of the trough and transported to outboard locations for spreading on the ground, said sidewalls having upper extremities, said diffuser having a pair of oppositely directed outlet ports adjacent the floor of the trough and spaced below said upper extremities of the sidewalls, one of said ports being directed toward one end of the trough and the other of said ports being directed toward the other end of the trough.

3. A chaff spreader attachment as claimed in claim 2, said diffuser having a single air inlet and structure for dividing a single flow of air through said inlet into the two separate air streams leaving the diffuser through said outlet ports.

4. A chaff spreader attachment as claimed in claim 3, said air inlet of the diffuser being disposed at substantially right angles to the outlet ports and in generally the same horizontal plane whereby to promote linear flow along the floor of the trough.

5. A chaff spreader attachment as claimed in claim 1, said outlet ports and said air inlet being symmetrical with respect to a common horizontal plane that contains the central axis of the air inlet,
said outlet ports having reduced vertical dimensions relative to the air inlet, and the diffuser being provided with internal passages communicating the outlet ports with the air inlet and tapering toward the outlet ports whereby to progressively diminish the cross-sectional size of the air streams.

6. A chaff spreader attachment as claimed in claim 2, said diffuser being provided with a roof disposed above said outlet ports and having an apex extending transversely of the trough between said sidewalls,
said roof having a pair of slope sheets diverging downwardly from the apex and generally toward said outlet ports for directing chaff particles toward the air streams issuing from the outlet ports.

7. A chaff spreader attachment as claimed in claim 6, said trough having an upwardly projecting deflector on the normally rearwardly disposed sidewall thereof for deflecting chaff particles from the chaff outlet into the trough.

8. A chaff spreader attachment as claimed in claim 2, said trough having an upwardly projecting deflector on the normally rearwardly disposed sidewall thereof for deflecting chaff particles from the chaff outlet into the trough.

9. A chaff spreader attachment for combines, including:
a trough having a pair of opposite discharge ends;
means for mounting said trough on a combine with the trough extending transverse to the normal path of travel of the combine and with a central portion thereof in position to catch chaff particles issuing from a chaff outlet of the combine;

a diffuser coupled with the trough and adapted to create two separate streams of air flowing in opposite directions along a floor of the trough from the central portion thereof to and beyond said outer ends of the trough; and
means for connecting the diffuser with a source of a continuing volume of air under pressure for causing chaff particles discharged from the chaff outlet of the combine to be entrained in the oppositely moving air streams of the trough and transported to outboard locations for spreading on the ground,
said diffuser having a pair of oppositely directed outlet ports adjacent the floor of the trough, one of said ports being directed toward one end of the trough and the other of aid ports being directed toward the other end of the trough,
said diffuser having a single air inlet and structure for dividing a single flow of air through said inlet into the two separate air streams leaving the diffuser through said outlet ports,
said diffuser having a pair of side-by-side outlet ports directed toward each end of the trough.

10. In a combine having a crop residue outlet, a spreader for said residue comprising:
a transversely extending, open-top trough positioned below the residue outlet for catching residue in a central portion of the trough as the residue issues from the residue outlet,
said trough having a pair of opposite discharge ends disposed laterally outboard of the residue outlet, a floor extending between said discharge ends, and a pair of spaced, front and rear walls projecting upwardly from said floor along the length of the latter;
an air diffuser coupled with the trough and adapted to create two separate streams of air flowing in opposite directions along said floor of the trough from the central portion thereof to and beyond said outer ends of the trough; and
means for supplying a continuing volume of air under pressure to said diffuser for causing residue discharged from the residue outlet of the combine to be entrained in the oppositely moving air streams of the trough and transported to outboard locations for spreading on the ground,
said front and rear walls having upper extremities,
said diffuser having a pair of oppositely directed outlet ports adjacent the floor of the trough and spaced below said upper extremities of the front and rear walls, one of said ports being directed toward one end of the trough and the other of said ports being directed toward the other end of the trough.

* * * * *